United States Patent
Kuo et al.

(10) Patent No.: US 9,034,964 B2
(45) Date of Patent: May 19, 2015

(54) WATERBORNE COATING COMPOSITIONS CONTAINING LOW-VOC COALESCENTS THAT ARE HYDROXYPIVALYL HYDROXYPIVALATE ESTERS

(75) Inventors: Thauming Kuo, Kingsport, TN (US); Phillip Bryan Hall, Jonesborough, TN (US)

(73) Assignee: Eastman Chemical Company, Kingsport, TN (US)

( * ) Notice: Subject to any disclaimer, the term of this patent is extended or adjusted under 35 U.S.C. 154(b) by 219 days.

(21) Appl. No.: 12/909,179

(22) Filed: Oct. 21, 2010

(65) Prior Publication Data

US 2012/0101225 A1   Apr. 26, 2012

(51) Int. Cl.
| | |
|---|---|
| C08K 5/00 | (2006.01) |
| C09D 7/06 | (2006.01) |
| C09D 5/02 | (2006.01) |
| C09D 133/08 | (2006.01) |
| C08K 5/10 | (2006.01) |

(52) U.S. Cl.
CPC ... *C09D 7/06* (2013.01); *C08K 5/10* (2013.01); *C09D 5/024* (2013.01); *C09D 133/08* (2013.01)

(58) Field of Classification Search
USPC .......................................... 524/284, 300, 569
See application file for complete search history.

(56) References Cited

U.S. PATENT DOCUMENTS

| | | | |
|---|---|---|---|
| 2,004,115 A | 6/1935 | Izard et al. | |
| 2,008,720 A | 7/1935 | Lawson et al. | |
| 4,634,730 A * | 1/1987 | Bogdany | 524/425 |
| 4,839,413 A | 6/1989 | Kiehlbauch et al. | |
| 4,927,876 A | 5/1990 | Coogan et al. | |
| 4,939,233 A | 7/1990 | Jenkins et al. | |
| 4,946,932 A | 8/1990 | Jenkins | |
| 5,137,961 A | 8/1992 | Goos et al. | |
| 5,247,040 A | 9/1993 | Amick et al. | |
| 5,296,530 A | 3/1994 | Bors et al. | |
| 5,484,849 A | 1/1996 | Bors et al. | |
| 6,051,314 A * | 4/2000 | Girgis | 428/375 |
| 7,524,896 B2 | 4/2009 | Kim et al. | |
| 8,383,710 B2 | 2/2013 | Kuo et al. | |
| 2006/0201879 A1* | 9/2006 | Den Boestert et al. | 210/634 |
| 2007/0015933 A1 | 1/2007 | Kim et al. | |
| 2008/0103340 A1 | 5/2008 | Binder et al. | |
| 2008/0193725 A1* | 8/2008 | De Saint-Romain | 428/195.1 |
| 2008/0242721 A1 | 10/2008 | Selifonov | |
| 2009/0118397 A1* | 5/2009 | Bloom | 524/13 |
| 2010/0113664 A1* | 5/2010 | Bradshaw et al. | 524/298 |
| 2010/0216915 A1* | 8/2010 | Bloom | 524/35 |

FOREIGN PATENT DOCUMENTS

| | | |
|---|---|---|
| EP | 0 492 847 A2 | 7/1992 |
| EP | 0501614 A2 | 9/1992 |
| WO | 2007094922 A2 | 8/2007 |
| WO | 2009097142 A1 | 8/2009 |

OTHER PUBLICATIONS

Elvacite, a website reference, Jun. 2004.*
Ferro, "Paint, Ink & coatings plasticizers", Jul. 2004.*
Eastman, "Eastman Plasticizer Technical Tip", Aug. 2006.*
ASTM International, Designation: D 2354-10; "Standard Test Method for Minimum Film Formation Temperature (MFFT) of Emulsion Vehicles"; Jul. 2010, Downloaded Sep. 22, 2010.
ASTM International, Designation: D2369-07; "Standard Test Method for Volatile Content of Coatings"; Aug. 2007.
ASTM International, Designation: D2369-10; "Standard Test Method for Volatile Content of Coatings"; Sep. 2010, Downloaded Sep. 28, 2010.
ASTM International, Designation: D3960-05; "Standard Practice for Determining Volatile Organic Compound (VOC) Content of Paints and Related Coatings"; Aug. 2005, Downloaded Sep. 22, 2010.
Moszner, Norbert et al.; "Reaction behavior of monomeric β-ketoesters"; Polymer Bulletin, vol. 23; pp. 419-426; 1994.
Smith, Oliver W., et al.; "New vinyl ester monomers for emulsion polymers"; Progress in Organic Coatings, vol. 22; pp. 19-25; 1993.
Office Action dated Jul. 20, 2012 for U.S. Appl. No. 12/909,198, filed Oct. 21, 2010.
Notice of Allowance dated Oct. 29, 2012 for co-pending U.S. Appl. No. 12/909,198.
Notification of Transmittal of the International Search Report and the Written Opinion of the International Searching Authority, or the Declaration, International Application No. PCT/US2011/056241 with a mailing date of Dec. 29, 2011.
Notification of Transmittal of the International Search Report and the Written Opinion of the International Searching Authority, or the Declaration, International Application No. PCT/US2011/056247 with a mailing date of Feb. 6, 2012.
Co-pending U.S. Appl. No. 12/909,198, filed Oct. 21, 2010; Thauming Kuo et al.

* cited by examiner

*Primary Examiner* — Wenwen Cai
(74) *Attorney, Agent, or Firm* — James K. Leonard; Dennis V. Carmen

(57) ABSTRACT

Waterborne coating compositions are disclosed that include a latex emulsion polymer, and, as a coalescent, a diester of hydroxypivalyl hydroxypivalate. The coating compositions of the invention have a reduced VOC content and provide satisfactory coalescing activity.

11 Claims, No Drawings

WATERBORNE COATING COMPOSITIONS CONTAINING LOW-VOC COALESCENTS THAT ARE HYDROXYPIVALYL HYDROXYPIVALATE ESTERS

FIELD OF THE INVENTION

This invention relates to waterborne coating compositions, and in particular, to coating compositions that include latex emulsion polymers and low-VOC coalescents that are hydroxypivalyl hydroxypivalate esters.

BACKGROUND OF THE INVENTION

Successful waterborne acrylic (or latex emulsion) coating compositions must deliver performance comparable to traditional solvent-borne coatings, while meeting increasingly stringent VOC (volatile organic compounds) emission regulations. It is known in the coatings art that the formation of a latex film can be facilitated by incorporating a coalescing agent in the latex emulsion. These coalescing agents, or coalescents, facilitate the individual latex particles coming together to thereby form a continuous film at a given temperature by reducing the minimum film-forming temperature (MFFT) of the latex polymer. Thus, as used throughout, the coalescents of the invention reduce the minimum film-forming temperatures of the coating compositions in which they are used, as further described below.

Traditional coalescents are described as fugitive coalescents since they tend to escape from the coating film over time. As a result, in some jurisdictions, such coalescents are regulated as VOCs, or volatile organic compounds. A need therefore exists for a non-fugitive coalescent that is capable of meeting the VOC regulations imposed on the paint industry.

Additionally, in recent years, there has been increased interest in renewable, bio-based materials, also due to environmental concerns. It is therefore an object of the invention to provide coalescents that may be used in coating compositions that are low in VOC emissions, and that can be made from bio-based materials.

U.S. Pat. No. 7,524,896 discloses a plasticizer composition that includes a hydroxypivalyl hydroxypivalate ester and a neopentylglycol ester. The plasticizer composition is said to provide a polyvinyl chloride resin having excellent properties of heat loss, migration resistance and plasticization efficiency, and tensile strength and elongation.

There remains a need in the art for latex coating compositions having a reduced VOC content compared with those taught in the art and that exhibit satisfactory coalescing activity.

SUMMARY OF THE INVENTION

In one aspect, the invention relates to waterborne coating compositions that include: (a) a latex emulsion polymer; and (b) a coalescent that is an ester of hydroxypivalyl hydroxypivalate, hereinafter HPHP.

In another aspect, the invention relates to waterborne coating compositions that include a latex emulsion polymer; and a hydroxypivalyl hydroxypivalate diester as a coalescent, represented by the formula (I):

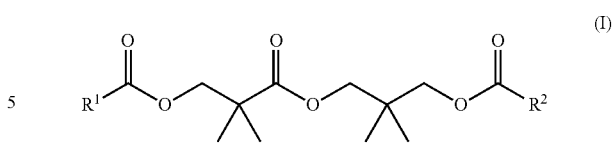

wherein $R^1$ and $R^2$ are each independently C1-C11 alkyl groups.

In yet another aspect, the invention relates to waterborne coating compositions in which the diester is a reaction product of hydroxypivalyl hydroxypivalate with one or more C2-C12 monofunctional carboxylic acids or their derivatives. The diesters may, for example, be made from one or more C2-C12 monofunctional carboxylic acids, for example one or more of acetic acid, propionic acid, butyric acid, isobutyric acid, pentanoic acid, hexanoic acid, levulinic acid, heptanoic acid, octanoic acid, 2-ethylhexanoic acid, 4-acetylbutyric acid, 4-oxohexanoic acid, 6-oxoheptanoic acid, 7-oxooctanoic acid, benzoic acid, nonanoic acid, decanoic acid, or dodecanoic acid. In another aspect, the diester may be a reaction product of hydroxypivalyl hydroxypivalate with one or more C4-C8 monofunctional carboxylic acids or their derivatives.

In yet another aspect, the one or more C4-C8 monofunctional carboxylic acids comprise one or more of: butyric acid, isobutyric acid, pentanoic acid, hexanoic acid, levulinic acid, heptanoic acid, octanoic acid, 2-ethylhexanoic acid, 4-acetylbutyric acid, 4-oxohexanoic acid, 6-oxoheptanoic acid, 7-oxooctanoic acid, or benzoic acid. In yet another aspect, the diester is a reaction product of hydroxypivalyl hydroxypivalate with one or more C5-C6 monofunctional carboxylic acids or their derivatives. In another aspect, the diester may be a reaction product of hydroxypivalyl hydroxypivalate with levulinic acid, hexanoic acid, or a mixture thereof.

In one aspect, the hydroxypivalyl hydroxypivalate diester may be present in an amount from about 1% to about 20% by weight, based on the solids of the latex polymer (a), or from 1% to 15% by weight, or from 1% to 10% by weight, in each case based on the solids of the latex polymer in (a).

In a further aspect, the diester may be a reaction product of hydroxypivalyl hydroxypivalate with levulinic acid, hexanoic acid, or a mixture thereof, and the diester may be present, for example, in an amount from about 1% to about 15% by weight, based on the solids of the latex polymer in (a).

In yet a further aspect, the waterborne coating compositions of the invention may further comprise one or more hydroxypivalyl hydroxypivalate monoesters.

Further aspects of the invention are as further described and claimed below.

DETAILED DESCRIPTION OF THE INVENTION

In one aspect, the invention relates to waterborne coating compositions that include one or more hydroxypivalyl hydroxypivalate (HPHP) esters as a coalescent, and especially HPHP diesters, or mixtures of monoesters and diesters. More specifically, the invention relates to a coalescent that comprises the reaction product of hydroxypivalyl hydroxypivalate and one or more monofunctional carboxylic acids or their derivatives. The coalescents of the invention are only slightly volatile, as further described below, and are therefore capable of providing an environmentally friendly waterborne coating composition.

In one embodiment of the present invention, there is thus provided a waterborne coating composition comprising (a) a latex emulsion polymer, and (b) a hydroxypivalyl hydroxypivalate diester as a coalescent. The diester is capable of reducing the minimum film forming temperature of the latex polymer, and the resulting aqueous coating compositions are substantially free of solid particulate substances resulting from the mixing of (a) and (b).

Examples of the latex emulsion polymers, component (a), include aqueous vinyl polymers, which are the reaction products of one or more ethylenically unsaturated monomers. Examples of the ethylenically unsaturated monomers include, but are not limited to, styrene, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, acrylic acid, methacrylic acid, itaconic acid, crotonic acid, α-methyl styrene, vinyl naphthalene, vinyl toluene, chloromethyl styrene, hydroxyethyl(meth)acrylate, hydroxypropyl(meth)acrylate, acrylonitrile, glycidyl methacrylate, acetoacetoxy ethyl methacrylate, acetoacetoxy ethyl acrylate, vinyl chloride, vinylidene chloride, vinyl acetate, butyl acrylamide, ethyl acrylamide, and the like.

Latex emulsion polymers are well known in the art of coating compositions, and we do not intend the term to be especially limiting, although some latex emulsion polymers may be better suited as coating compositions, either inherently or in combination with the coalescents of the invention. Examples of commercial latex emulsion polymers useful according to the invention include Rhoplex SG-30, Rhoplex HG-74P, Rhoplex SG-10M, Rhoplex AC2508, Ucar 626, and Ucar 379G (all available from The Dow Chemical Company), Acronal 296D (BASF Corp.), Aquamac 705 and Aquamac 588 (Hexion Specialty Chemicals), and the like.

The coalescent (b) comprises a diester of hydroxypivalyl hydroxypivalate (IUPAC: 3-Hydroxy-2,2-Dimethylpropyl 3-Hydroxy-2,2-Dimethylpropanoate) represented by the following formula I:

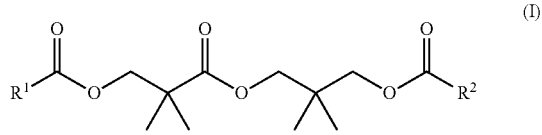

wherein $R^1$ and $R^2$ are each independently C1-C11 alkyl groups.

The diesters of the invention may be prepared by reacting hydroxypivalyl hydroxypivalate (HPHP) with one or more monofunctional carboxylic acids ($R^1$COOH and/or $R^2$COOH) or derivatives such as anhydrides, halides, or esters, at a molar ratio of about 1:2 (HPHP:carboxylic acids). Such esters may be synthesized by reacting an alcohol such as HPHP with a carboxylic acid or its derivative such as, for example, acid anhydride, acid halide, or acid ester; thus, it is to be understood that the term, carboxylic acid, described in this invention is meant to include derivatives that can be utilized as a reactant to produce an ester.

The monofunctional carboxylic acids used to prepare the diesters of the invention are organic compounds having a single carboxyl group. The present inventors have discovered that certain monofunctional carboxylic acids are particularly suitable for this invention. The hydroxypivalyl hydroxypivalate diesters (HPHP diesters) of such monofunctional carboxylic acids not only are capable of reducing the MFFT of the latex polymers with which they are blended, but also have good compatibility with the latex emulsions. When we say that the HPHP diesters have good compatibility with the latex emulsion with which they are blended, we mean that when the HPHP diesters are mixed thoroughly with the latex emulsion, the resulting formulation is substantially free of solid particulate substances. The presence of such heterogeneous particles resulting from incompatibility in the aqueous formulations might otherwise lead to coating defects and render the coalescents not commercially viable.

The monofunctional carboxylic acids suitable for this invention may be either aliphatic or aromatic, straight chain or branched, substituted or unsubstituted. We note that the HPHP diesters based on carboxylic acids having straight chain carbons longer than eight may be less compatible with latex emulsions. The compatibility may be improved by using branched carboxylic acids or by using mixed carboxylic acids with different chain lengths.

Examples of the monofunctional carboxylic acids useful according to the invention to form the HPHP diesters include acetic acid, propionic acid, butyric acid, isobutyric acid, pentanoic acid, hexanoic acid, levulinic acid, heptanoic acid, octanoic acid, 2-ethylhexanoic acid, neopentanoic acid, neoheptanoic acid, 3,5,5-trimethylhexanoic acid, neodecanoic acid, 4-acetylbutyric acid, 4-oxohexanoic acid, 6-oxoheptanoic acid, 7-oxooctanoic acid, benzoic acid, nonanoic acid, decanoic acid, dodecanoic acid, and mixtures thereof. Monofunctional carboxylic acids that can be produced from renewable resources are of particular interest. Examples of such bio-based carboxylic acids include n-hexanoic acid, levulinic acid, n-octanoic acid, n-decanoic acid, and n-dodecanoic acid.

Preferred monofunctional carboxylic acids include C4-C8 carboxylic acids, examples of which include, but are not limited to, butyric acid, isobutyric acid, pentanoic acid, hexanoic acid, levulinic acid, heptanoic acid, octanoic acid, 2-ethylhexanoic acid, neopentanoic acid, neoheptanoic acid, 4-acetylbutyric acid, 4-oxohexanoic acid, 6-oxoheptanoic acid, 7-oxooctanoic acid, benzoic acid, and mixtures thereof.

Preferred monofunctional carboxylic acids further include C5-C7 carboxylic acids, examples of which include, but are not limited to, levulinic acid, hexanoic acid, neopentanoic acid, neoheptanoic acid, and mixtures thereof. The HPHP diesters based on these C5-C7 carboxylic acids have been found to have low VOC and good coalescent efficiency, while still retaining excellent compatibility with the latex emulsions.

The efficiency of a coalescent can be determined by judging from the amount of the coalescent required to reduce the MFFT of a latex polymer to 40° F. (4.4° C.), which is the lowest desirable application temperature of a paint. It is generally considered unacceptable if the amount of the coalescent present in a paint formulation exceeds 20% by weight based on the solids of the latex polymer. This is particularly important for a non-volatile coalescent since the coalescent will remain in the dried film and thus cause a detrimental effect on the coating properties such as, for example, hardness, scrub resistance, and block resistance.

Thus, in another embodiment this invention provides a waterborne coating composition comprising from about 1 to about 20 percent, based on the solids of the latex polymer in the composition, of a hydroxypivalyl hydroxypivalate diester as a coalescent, or from 1 to 15 percent, or from 1 to 10 percent, in each instance based on the solids of the latex polymer in the composition.

The hydroxypivalyl hydroxypivalate diesters of the invention can be prepared by reacting HPHP with one or more monofunctional carboxylic acids to effect the formation of the ester linkage. The reaction may be carried out in the presence of an acid or base catalyst or in the presence of an enzyme catalyst with or without an organic solvent. Examples of acid catalysts include sulfuric acid, hydrochloric acid, p-toluenesulfonic acid, butylstannoic acid, borontrifluoride etherate, and the like. Examples of base catalysts include potassium hydroxide, sodium hydroxide, triethylamine, and the like. Examples of enzyme catalysts include lipase M (*Mucor javanicus*), *Candida cylindracea* lipase, lipase D (*Rhizopus delemar*), Lipozyme (*Mucor miehei*) (Novo Nordisk A/S Corp.), and the like. The reaction can be carried out at room temperature or at an elevated temperature.

Alternatively, a derivative of the carboxylic acid, such as acid anhydride, acid halide, or acid ester, may be used as the reactant to react with HPHP to obtain the corresponding diester using a method known in the art.

The hydroxypivalyl hydroxypivalate diesters useful according to the invention may include significant amounts of monoesters of HPHP either as a result of incomplete reaction or as a means to increase the content of hydroxyl functionality in the product. The hydroxyl content can be increased by increasing the ratio of the monoester of HPHP in the coalescent composition. The higher hydroxyl content may be advantageous, for example, in improving the coalescent's compatibility with a latex or enhancing the coating's properties.

Thus, in another embodiment, the waterborne coating composition of the present invention further comprises a hydroxypivalyl hydroxypivalate monoester. The presence of the monoester can be obtained by reacting an excess of HPHP with a monofunctional carboxylic acid, such as, for example, at a molar ratio of 1:1.9 or 1:1.8 (HPHP: carboxylic acid). The molar percent of monoester present, with respect to the total amount of monoester and diester present, may thus be up to 20 mole percent, or up to 10 mole percent, or up to 5 mole percent, or from 0.5 mole percent to 20 mole percent, or from 1 mole percent to 15 mole percent, or from 1 mole percent to 10 mole percent, for example.

The hydroxypivalyl hydroxypivalate diester of this invention may be blended with other coalescents for ease of handling, storage, or application. For example, a solid HPHP diester may be blended with a liquid coalescent such as Optifilm Enhancer 400 (Eastman Chemical Co.) at various ratios to yield a coalescent in liquid form. The hydroxypivalyl hydroxypivalate diester of the present invention may also be blended with other HPHP diesters or other coalescents to improve the compatibility with latex emulsions.

The coating compositions of the present invention may further comprise other components commonly used in a paint formulation such as, for example, pigments, filler, rheology modifiers, thickeners, wetting and dispersing agents, deformers, freeze-thaw additives, colorants, open-time additives, driers, catalysts, crosslinkers, biocides, light stabilizers, and the like.

The HPHP esters and diesters useful according to the invention are found to be effective in reducing the MFFT of coating compositions to which they are added, as well as providing specimen coatings having a weight percent volatile content of less than 10%, as measured according to the heating schedule specified by ASTM Method D2369. This test may be conducted generally by heating the sample in a forced air oven at 110° C. for 60 minutes. The weight loss after the test is deemed to result from a loss of volatiles originally present in the sample; the percent volatile present in the original sample may then be calculated. Although the cited test can be conducted on coating compositions containing other components such as latex polymers, the values cited herein were obtained from a sample of the coalescent itself. Thus, the weight percent volatile of a coalescent is used herein as a yardstick to measure the amount of VOC the coalescent would contribute to the VOC of a coating composition.

In another aspect, the invention provides waterborne coating compositions comprising (a) a latex emulsion polymer and (b) one or more HPHP diesters as the coalescent, wherein the ester provides a volatile content, for example, of less than 10% by weight. Examples of such esters (b) include HPHP diesters of levulinic acid, hexanoic acid, octanoic acid, and mixtures thereof, and the like.

Further, the diesters according to the invention based on HPHP are found to be effective in reducing MFFT as well as having a volatile content less than 10% as determined by ASTM Method D2369.

The efficiency of a coalescent can be determined by determining the amount of the coalescent required to reduce the MFFT of a latex polymer to 40° F. (4.4° C.), which is the lowest desirable application temperature of a paint. It is generally considered unacceptable if the amount of the coalescent present in a paint formulation exceeds 20% by weight based on the solids of the latex polymer. This is particularly important for a non-volatile coalescent since the coalescent will remain in the dried film and thus cause a detrimental effect on the coating properties such as, for example, hardness, scrub resistance, and block resistance. As shown in Example 5, the coalescents of the examples are capable of reducing the MFFT of Rhoplex SG-30 from 12.9° C. to 0.8-5.2° C. when an amount of 5 phr (or 5 part per hundred of resin solids) is used, while the MFFT of Rhoplex HG-74P is reduced from 30° C. to 0-7.2° C. when an amount of 10 phr of the coalescent is used.

Thus, in another embodiment, the invention provides a waterborne coating composition comprising from about 1 to about 20 percent by weight, based on the solids of the latex polymer in the composition, of an HPHP diester as the coalescent, as already described. In some instances, a preferred ratio of from 1 to 15 percent may be desired, or alternatively, from 1 to 10 percent.

It may be particularly advantageous to add driers to the coating formulations when the ester of the present invention is based on an unsaturated fatty acid. The added driers are capable of promoting oxidative crosslinking of the unsaturated moieties and thus providing enhanced coating properties. Examples of commercial driers include Zirconium HEX-CEM, Cobalt TEN-CEM, Calcium CEM-ALL, Zirconium HYDRO-CEM, and Cobalt HYDRO-CURE II sold by OMG Americas of Westlake, Ohio.

In other aspects, the latex emulsion polymers useful according to the invention may be homopolymers, or copolymers of an ethylenically unsaturated monomer and one or more additional copolymerizable monomers.

The polymers according to the invention are addition polymers that may be formed via a free-radical addition polymerization. In such addition polymers, the propagating species may be a free radical, and the polymer is formed in a chain-growth fashion polymerization as understood in the art. As noted, these polymers are latex emulsion polymers in which a monomer solution may be emulsified in an aqueous solution, and under agitation reacted via a free-radical polymerization process as described herein, to form latex particles.

Thus, the water-based latexes useful according to the invention may generally be prepared by polymerizing acrylic (ethylenically unsaturated) monomers. Before conducting polymerization, these ethylenically unsaturated monomers are either pre-emulsified in water/surfactant mixture or used as such.

The polymerization process of making these 'acrylic' latexes may also require an initiator (oxidant), a reducing agent, or a catalyst. Suitable initiators include conventional initiators such as ammonium persulfate, sodium persulfate, hydrogen peroxide, t-butyl hydroperoxide, ammonium or alkali sulfate, di-benzoyl peroxide, lauryl peroxide, di-tertiarybutylperoxide, 2,2-azobisisobutyronitrile, benzoyl peroxide, and the like.

Suitable reducing agents are those which increase the rate of polymerization and include, for example, sodium bisulfite, sodium hydrosulfite, sodium formaldehyde sulfoxylate, ascorbic acid, isoascorbic acid, and mixtures thereof.

Suitable catalysts are those compounds which promote decomposition of the polymerization initiator under the polymerization reaction conditions thereby increasing the rate of polymerization. Suitable catalysts include transition metal compounds and driers. Examples of such catalysts include, but are not limited to, AQUACATÔ, ferrous sulfate heptahydrate, ferrous chloride, cupric sulfate, cupric chloride, cobalt acetate, cobaltous sulfate, and mixtures thereof.

A conventional surfactant or a combination of surfactants is used as a stabilizer, such as an anionic or non-ionic emulsifier, in the suspension or emulsion polymerization preparation of a latex emulsion polymer of the invention. Examples of preferred surfactants include, but are not limited to, alkali or ammonium alkylsulfate, alkylsulfonic acid, or fatty acid, oxyethylated alkyphenol, sulfosuccinates and derivatives, or any combination of anionic or non-ionic surfactants. A list of suitable surfactants is available in the treatise: McCutcheon's Emulsifiers & Detergents, North American Edition, MC Publishing Co., Glen Rock, N.J., 1997. Preferably, the surfactant will provide droplet/particle stability, but result in minimal aqueous phase nucleation (micellar or homogeneous).

The latex emulsion polymers of the invention are thus prepared from monomers characterized as being ethylenically unsaturated monomers that can participate in addition polymerization reactions. As used herein, ethylenically unsaturated monomers may also be described as vinyl monomers. The polymers made from such monomers are thus addition polymers, and may be formed as emulsion polymers, also known as latexes or latex emulsions.

The latex emulsion polymers useful according to the invention may have pendant moieties, meaning that the ethylenically unsaturated monomers used to prepare the latex polymers of the invention have been reacted into an addition polymer, and that a portion of the monomers remains as a pendant moiety. Alternatively, we may say that the polymers according to the invention have residues from the ethylenically unsaturated monomers of the invention, in which case we mean that the monomers have been reacted into an addition polymer via their ethylenic unsaturation, and that a portion of the monomers remains as a residue. Both these descriptions are well-known in the art of addition polymers, and the descriptions are not otherwise intended to be especially limiting.

In one aspect, the invention thus relates to the use of emulsion polymers which are also known as latexes, or as used herein, latex emulsions. In these latexes, the polymers formed may have a particle size ranging, for example, from about 80 to about 300 nm, or from 100 nm to 250 nm, or from 125 nm to 200 nm. The $T_g$ of such latexes may range, for example, from about 0° C. to about 80° C., or from 15° C. to 60° C., or from 20° C. to 40° C.

The latex emulsion polymers useful according to the invention may be prepared by an emulsion free-radical polymerization of ethylenically unsaturated monomers. These latex polymers may be homopolymers, or may be copolymers formed from more than one ethylenically unsaturated monomer.

Examples of ethylenically unsaturated monomers include, but are not limited to, acrylic and methacrylic acid esters such as methyl(meth)acrylate, ethyl (meth)acrylate, propyl(meth)acrylate, isopropyl(meth)acrylate, butyl(meth)acrylate, isobutyl(meth)acrylate, hexyl(meth)acrylate, isooctyl(meth)acrylate, isodecyl (meth)acrylate, lauryl(meth)acrylate, stearyl(meth)acrylate, phenoxyethyl (meth)acrylate, methoxyethyl(meth)acrylate, benzyl(meth)acrylate, ethoxyethyl (meth)acrylate, 2-ethylhexyl(meth)acrylate, cyclopentyl (meth)acrylate and isobutyl (meth)acrylate, as well as combinations of these monomers. A combination of these monomers may be used in order to achieve an appropriate Tg or other properties for the latex emulsion polymer.

Such acrylic and methacrylic acid esters having a C1-C20 alcohol moiety are commercially available or can be prepared by known esterification processes. The acrylic and methacrylic acid ester may contain additional functional groups, such as, hydroxyl, amine, halogen, ether, carboxylic acid, amide, nitrile, and alkyl group. Such esters include carbodiimide(meth)acrylate, methyl(meth)acrylate, ethyl(meth)acrylate, butyl(meth)acrylate, isobutyl(meth)acrylate, ethylhexyl(meth)acrylate, octyl (meth)acrylate, isobutyl(meth)acrylate, allyl(meth)acrylate, and glycidyl(meth)acrylate.

Additional suitable polymerizable ethylenically unsaturated monomers include styrenic monomers. Styrenic monomers include styrene, as well as substituted styrenes such as C1-C6 alkyl ring-substituted styrene, C1-C3 alkyl alpha-substituted styrene or a combination of ring and an alpha-alkyl substituted styrene. Such styrenic polymerizable monomers include styrene, p-methyl styrene, o-methyl styrene, p-butyl styrene, alpha-methyl styrene, and combinations thereof.

In addition, vinyl esters may be used as copolymerizable monoethylenically unsaturated monomers, including vinyl esters of vinyl alcohol such as the VEOVA series available from Shell Chemical Company as VEOVA 5, VEOVA 9, VEOVA 10, and VEOVA 11 products. See O. W. Smith, M. J. Collins, P. S. Martin, and D. R. Bassett, Prog. Org. Coatings 22, 19 (1993).

In general, the vinyl monomers may be polymerized by a conventional emulsion free-radical initiated polymerization technique. The polymerization can be initiated by a water-soluble or water-dispersible free-radical initiator, optionally in combination with a reducing agent, at an appropriate temperature, for example from 55 to 90° C. The polymerization of the monomers may be conducted batch wise, semi-batch, or in a continuous mode.

A conventional surfactant or a combination of surfactants may be used such as anionic or non-ionic emulsifier in the suspension or emulsion polymerization to prepare a polymer of the invention. Examples of such surfactants include, but are not limited to, alkali or ammonium alkylsulfate, alkylsulfonic acid, or fatty acid, oxyethylated alkylphenol, or any combination of anionic or non-ionic surfactant. A surfactant monomer may be used such as HITENOL HS-20 (which is a polyoxyethylene alkylphenyl ether ammonium sulfate available from DKS International, Inc., Japan). A list of surfactants is available in the treatise: McCutcheon's Emulsifiers & Detergents, North American Edition and International Edition, MC Publishing Co., Glen Rock, N.J. 1993. The amount of the surfactant used is usually between 0.1 to 6 wt %, based on the total weight of the monomers.

As polymerization initiators, any conventional free-radical initiator may be used such as hydrogen peroxide, t-butylhydroperoxide, ammonium or alkali sulfate, di-benzoyl peroxide, lauryl peroxide, di-tertiarybutylperoxide, 2,2'-azobisisobuteronitrile, benzoyl peroxide, and the like. The amount of the initiator is typically between 0.05 to 6.0 wt %, based on the total weight of the total monomers.

A free-radical initiator may be combined with a reducing agent to form a redox initiating system. Suitable reducing agents are those which increase the rate of polymerization and include, for example, sodium bisulfide, sodium hydrosulfide, sodium, ascorbic acid, isoascorbic acid and mixtures thereof. The redox initiating system can be used at similar levels as the free-radical initiators.

In addition, in combination with the initiators and reducing agents, polymerization catalysts may be used. Polymerization catalysts are those compounds which increase the rate of polymerization by promoting decomposition of the free radical initiator in combination with the reducing agent at the reaction conditions. Suitable catalysts include transition metal compounds such as, for example, ferrous sulfate heptahydrate, ferrous chloride, cupric sulfate, cupric chloride, cobalt acetate, cobaltous sulfate, and mixtures thereof.

In addition, a low level of a chain transfer agent may also be used to prepare a latex polymer useful in accordance with the invention. Suitable chain transfer agents include, but are not limited to, butyl mercaptan, n-octylmercaptan, n-dodecyl mercaptan, butyl or methyl mercaptopropionate, mercaptopropionic acid, 2-ethylhexyl-3-mercaptopropionate, n-butyl-3-mercaptopropionate, isodecylmercaptan, octadecylmercaptan, mercaptoacetic acid, haloalkyl compounds, (such as carbon tetrabromide and bromodichloromethane), and the reactive chain transfer agents described in U.S. Pat. No. 5,247,040, incorporated herein by reference. In particular, mercaptopropionate, allyl mercaptopropionate, allyl mercaptoacetate, crotyl mercaptopropionate and crotyl mercaptoacetate, and mixtures thereof, represent preferred chain transfer agents.

A copolymerizable monomer known to promote wet adhesion may also be incorporated into the polymer. Examples of wet adhesion promoting monomers include, but are not limited to, nitrogen-containing monomers such as t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate and N-(2-methacryloyloxyethyl)ethylene urea.

Water-dispersible and water-soluble polymers may also be employed as surfactants or stabilizers in accordance with the present invention. Examples of such polymeric stabilizers include water-dispersible polyesters as described in U.S. Pat. Nos. 4,946,932 and 4,939,233; water-dispersible polyurethanes as described in U.S. Pat. Nos. 4,927,876 and 5,137,961; and alkali-soluble acrylic resins as described in U.S. Pat. No. 4,839,413, all of which are incorporated herein by reference. Cellulosics and polyvinyl alcohols may also be used. Surfactants and stabilizers may be used during the polymerization to control, for example, particle nucleation and growth, particle size and stability or they may be post-added to enhance stability of the latex or to modify other properties of the latex such as surface tension, wettability, and the like.

In one embodiment, at least one ethylenically unsaturated copolymerizable surfactant may be employed, for example those possessing isopropenyl phenyl or allyl groups. Copolymerizable surfactants may be anionic, such as containing a sulfate or sulfonate group, or nonionic surfactants. Other copolymerizable surfactants include those containing polyoxyethylene alkyl phenyl ether moieties. Additional copolymerizable surfactants include sodium alkyl allyl sulfosuccinate.

The latex polymers in accordance with the invention may have a weight average molecular weight (Mw), for example, of from 1,000 to 1,000,000, as determined by gel permeation chromatography (GPC), or from 5,000 to 250,000.

The particle size for the aqueous dispersions in accordance with the invention may be, for example, from about 0.01 to about 25 µm, or from 0.05 to 1 µm, or from 0.075 to 500 µm. Thus, in an emulsion polymerization in accordance with the invention, the particle size of the latex may range, for example, from 0.01 to 5 µm.

The latex particles generally have a spherical shape, and the spherical polymeric particles may have a core portion and a shell portion or a gradient structure. The core/shell polymer particles may also be prepared in a multi-lobe form, a peanut shell, an acorn form, a raspberry form, or any other form. If the particles have a core/shell structure, the core portion may comprise from about 20 to about 80 wt % of the total weight of the particle, and the shell portion may comprise about 80 to about 20 wt % of the total weight of the particle.

The glass transition temperature (Tg) of the latex polymers in accordance with the present invention, in the absence of the coalescents described herein, may be up to about 100° C. In a preferred embodiment of the present invention, where a film forming at ambient temperatures of the particles is desirable, the glass transition temperature of the polymer itself may be under 60° C., or under 40° C.

The latex polymers of the invention may comprise enamine functional polymers, with the enamine functionality serving to improve the hydrolytic stability of the acetoacetoxy group. Enamine functional polymers have been described in Polymer Bulletin 32, 419-426 (1994). Additionally, enamine functional polymers are described in European Patent Application No. 0492847 A2; U.S. Pat. No. 5,296,530; and U.S. Pat. No. 5,484,849, all of which are incorporated herein by reference.

EXAMPLES

The following examples are given to illustrate the invention. It should be understood, however, that the invention is not to be limited to the specific conditions or details described in these examples.

Example 1

Synthesis of Hydroxypivalyl Hydroxypivalate Diester of Hexanoic Acid (HPHP Diester 1)

To a 500 mL, three-neck, round-bottom flask equipped with a mechanical stirrer, a steam partial condenser, a Dean-Stark adapter, a water condenser, and a nitrogen inlet were added hexanoic acid (63.89 g, 0.55 mole), Eastman HPHP Glycol (40.85 g, 0.20 mole), and the catalyst, Fascat 4100 (butylstannoic acid) (0.13 g) (Arkema Inc.). The stirred mixture was gradually heated to 130° C. and the resulting condensate (water) collected in the Dean-Stark trap. The mixture was allowed to react further at 150-210° C. until 6 mL of water was collected (about 7 hours total reaction time). After having been cooled to room temperature, the resulting mixture was taken in methylene chloride, extracted twice with diluted KOH in water, and then neutralized with diluted HCl in water. The organic layer was collected, dried over anhydrous sodium sulfate, and filtered through glass wool. Solvent was subsequently removed under reduced pressure to yield a liquid product (49.0 g).

Example 2

Synthesis of Hydroxypivalyl Hydroxypivalate Diester of Levulinic Acid (HPHP Diester 2)

To a 500 mL, three-neck, round-bottom flask equipped with a mechanical stirrer, a steam partial condenser, a Dean-Stark adapter, a water condenser, and a nitrogen inlet were added levulinic acid (63.89 g, 0.55 mole), Eastman HPHP Glycol (40.85 g, 0.20 mole), and the catalyst, Fascat 4100 (0.13 g) (Arkema Inc.). The stirred mixture was gradually heated to 130° C. and the resulting condensate (water) collected in the Dean-Stark trap. The mixture was allowed to react further at 150-200° C. until 7 mL of water was collected (about 5.5 hours total reaction time). After having been cooled to room temperature, the resulting mixture was taken in methylene chloride, extracted twice with diluted KOH in water, and then neutralized with diluted HCl in water. The organic layer was collected, dried over anhydrous sodium sulfate, and filtered through glass wool. Solvent was subsequently removed under reduced pressure to yield a liquid product (35.9 g).

Example 3

Synthesis of a Hydroxypivalyl Hydroxypivalate Mixed Diester of Levulinic Acid and Hexanoic Acid (HPHP Diester 3)

To a 500 mL, three-neck, round-bottom flask equipped with a mechanical stirrer, a steam partial condenser, a Dean-Stark adapter, a water condenser, and a nitrogen inlet were added levulinic acid (31.95 g, 0.275 mole), hexanoic acid (31.95 g, 0.275 mole), Eastman HPHP Glycol (40.85 g, 0.20 mole), and the catalyst, Fascat 4100 (0.13 g) (Arkema Inc.). The stirred mixture was gradually heated to 130° C. and the resulting condensate (water) collected in the Dean-Stark trap. The mixture was allowed to react further at 150-200° C. until 7 mL of water was collected (about 5 hours total reaction time). After having been cooled to room temperature, the resulting mixture was taken in methylene chloride, extracted twice with diluted KOH in water, and then neutralized with diluted HCl in water. The organic layer was collected, dried over anhydrous sodium sulfate, and filtered through glass wool. Solvent was subsequently removed under reduced pressure to yield a liquid product (65.0 g).

Example 4

Synthesis of a Hydroxypivalyl Hydroxypivalate Mixed Diester of Hexanoic Acid and Octanoic Acid (HPHP Diester 4)

To a 500 mL, three-neck, round-bottom flask equipped with a mechanical stirrer, a steam partial condenser, a Dean-Stark adapter, a water condenser, and a nitrogen inlet were added hexanoic acid (31.95 g, 0.275 mole), octanoic acid (39.66 g, 0.275 mole), Eastman HPHP Glycol (40.85 g, 0.20 mole), and the catalyst, Fascat 4100 (0.13 g) (Arkema Inc.). The stirred mixture was gradually heated to 140° C. and the resulting condensate (water) collected in the Dean-Stark trap. The mixture was allowed to react further at 160-210° C. until 6.5 mL of water was collected (about 5 hours total reaction time). After having been cooled to room temperature, the resulting mixture was taken in methylene chloride, extracted twice with diluted KOH in water, and then neutralized with diluted HCl in water. The organic layer was collected, dried over anhydrous sodium sulfate, and filtered through glass wool. Solvent was subsequently removed under reduced pressure to yield a liquid product (72.0 g).

Example 5

Preparation of Latex Formulations and Determination of their MFFTs

Each of the HPHP diesters synthesized in the above examples was formulated, respectively, with the latexes Rhoplex SG-30 (an acrylic polymer emulsion) (50% solids; MFFT 12.9° C.) and Rhoplex HG-74P (a styrene-acrylic polymer emulsion) (42.5% solids; MFFT 30° C.) (both available from The Dow Chemical Company) at various ratios for MFFT determination.

Minimum film forming temperatures (MFFT) were determined using a MFFT bar (Rhopoint MFFT-60 available from Rhopoint Instruments Limited), which is designed to conform to ASTM D2354. The MFFT bar is equipped with sensors, heating elements, and circulating cooling water for controlling the temperature gradient. A program controlling the temperature range of 0° C. to 18° C. was selected for MFFT determination, and a 6-mil applicator was used to drawdown the samples. As used herein, ASTM D2354 refers to D2354-10, edition approved Jul. 1, 2010, originally approved in 1965, with a last previous edition approved in 1998 as D2354-98 which was withdrawn March 2007 and reinstated in July 2010.

After a constant-temperature gradient was established on the MFFT bar, samples were drawn down from the low- to the high-temperature of the bar by using a 6-mil, multi-sample draw-down bar; the resulting coating strips were covered and allowed to dry under nitrogen purge at temperatures ranging from 0° C. to 18° C. Approximately a period of two-three hours is required for the films to dry. MFFT was determined by observing the position along the temperature gradient of the draw-down surface where the dried films showed signs of cracking.

TABLE 1

Minimum film forming temperatures (MFFT) of latex formulations containing HPHP Diester 1

| Formulation | Latex | HPHP Diester 1 | Diester 1 Ratio | MFFT |
|---|---|---|---|---|
| #1-1 | SG-30; 20.0 g | 0.5 g | 5 phr | 0.8° C. |
| #1-2 | SG-30; 20.0 g | 1.0 g | 10 phr | <0° C. |
| #1-3 | HG-74P; 23.5 g | 0.5 g | 5 phr | 8° C. |
| #1-4 | HG-74P; 23.5 g | 1.0 g | 10 phr | <0° C. |

TABLE 2

Minimum film forming temperatures (MFFT) of latex formulations containing HPHP Diester 2

| Formulation | Latex | HPHP Diester 2 | Diester 2 Ratio | MFFT |
|---|---|---|---|---|
| #2-1 | SG-30; 20.0 g | 0.5 g | 5 phr | 5.2° C. |
| #2-2 | SG-30; 20.0 g | 1.0 g | 10 phr | 0° C. |
| #2-3 | HG-74P; 23.5 g | 0.5 g | 5 phr | 16.9° C. |

TABLE 2-continued

Minimum film forming temperatures (MFFT) of latex
formulations containing HPHP Diester 2

| Formulation | Latex | HPHP Diester 2 | Diester 2 Ratio | MFFT |
|---|---|---|---|---|
| #2-4 | HG-74P; 23.5 g | 1.0 g | 10 phr | 7.2° C. |
| #2-5 | HG-74P; 23.5 g | 1.5 g | 15 phr | 0.4° C. |

TABLE 3

Minimum film forming temperatures (MFFT) of latex
formulations containing HPHP Diester 3

| Formulation | Latex | HPHP Diester 3 | Diester 3 Ratio | MFFT |
|---|---|---|---|---|
| #3-1 | SG-30; 20.0 g | 0.5 g | 5 phr | 3.0° C. |
| #3-2 | SG-30; 20.0 g | 1.0 g | 10 phr | <0° C. |
| #3-3 | HG-74P; 23.5 g | 0.5 g | 5 phr | 10.4° C. |
| #3-4 | HG-74P; 23.5 g | 1.0 g | 10 phr | 2.8° C. |

TABLE 4

Minimum film forming temperatures (MFFT) of latex
formulations containing HPHP Diester 4

| Formulation | Latex | HPHP Diester 4 | Diester 4 Ratio | MFFT |
|---|---|---|---|---|
| #4-1 | SG-30; 20.0 g | 0.5 g | 5 phr | 3.8° C. |
| #4-2 | SG-30; 20.0 g | 1.0 g | 10 phr | <0° C. |
| #4-3 | HG-74P; 23.5 g | 0.5 g | 5 phr | 13.1° C. |
| #4-4 | HG-74P; 23.5 g | 1.0 g | 10 phr | <0° C. |

As shown in Example 5, the coalescents of the examples are capable of reducing the MFFT of Rhoplex SG-30 from 12.9° C. to 0.8-5.2° C. when an amount of 5 phr (or 5 part per hundred of resin solids) is used, while the MFFT of Rhoplex HG-74P is reduced from 30° C. to 0-7.2° C. when an amount of 10 phr of the coalescent is used.

Example 6

Determination of VOC Values of Various HPHP Diesters

The percentage of volatile organic compounds (VOCs) was determined in accordance with the heating schedule specified by ASTM Method D2369. A sample (about 0.3 g) of each inventive diester was measured into a pre-weighed aluminum pan (58 mm in diameter by 18 mm high) and the precise weight of the sample recorded. Acetone (about 3 g) was then added to spread out the liquid sample or to dissolve the solid sample. A paper clip was used to stir the sample in the pan and was included in the weight calculation. The aluminum pan with the paper clip was then placed in a forced air oven at 110° C. for 60 minutes. The portion of the sample that had been lost during this test was considered volatile content, and its weight ratio determined.

| HPHP Diester | Diester 1 | Diester 2 | Diester 3 | Diester 4 |
|---|---|---|---|---|
| VOC | 4.6% | 1.3% | 3.0% | 3.1% |

We claim:
1. A waterborne coating composition comprising:
   (a) a latex emulsion polymer; and
   (b) a coalescent comprising a hydroxypivalyl hydroxypivalate diester represented by the formula:

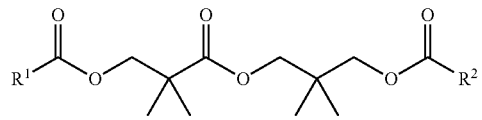

wherein R1 and R2 are each independently C1-C11 alkyl groups; wherein the amount of the hydroxypivalyl hydroxypivalate diester in the waterborne coating composition is in an amount from about 1 to about 20 wt. %, based on the weight of the solids of the latex polymer; wherein the waterborne coating composition is substantially free of solid particulate substances resulting from the combination of (a) and (b); and
wherein the latex emulsion polymer (a) is prepared by emulsion polymerization of one or more ethylenically unsaturated monomers selected from the group consisting of styrene, methyl (meth)acrylate, ethyl (meth)acrylate, propyl (meth)acrylate, isopropyl (meth)acrylate, butyl (meth)acrylate, isobutyl (meth)acrylate, hexyl (meth)acrylate, octyl (meth)acrylate, isooctyl (meth)acrylate, isodecyl (meth)acrylate, lauryl (meth)acrylate, stearyl (meth)acrylate, phenoxyethyl (meth)acrylate, methoxyethyl (meth)acrylate, benzyl (meth)acrylate, ethoxyethyl (meth)acrylate, 2-ethylhexyl (meth)acrylate, cyclopentyl (meth)acrylate, isobutyl (meth)acrylate, acrylic acid, methacrylic acid, itaconic acid, crotonic acid, α-methyl styrene, vinyl naphthalene, vinyl toluene, hydroxyethyl (meth)acrylate, hydroxypropyl (meth)acrylate, acrylonitrile, glycidyl methacrylate, acetoacetoxy ethyl methacrylate, acetoacetoxy ethyl acrylate, vinyl acetate, butyl acrylamide, and ethyl acrylamide.

2. The waterborne coating composition of claim 1, wherein the diester is a reaction product of hydroxypivalyl hydroxypivalate with one or more C2-C12 monofunctional carboxylic acids or their anhydride, halide, or ester derivatives.

3. The waterborne coating composition of claim 2, wherein the one or more C2-C12 monofunctional carboxylic acids comprises one or more selected from the group consisting of acetic acid, propionic acid, butyric acid, isobutyric acid, pentanoic acid, hexanoic acid, levulinic acid, heptanoic acid, octanoic acid, 2-ethylhexanoic acid, 4-acetylbutyric acid, 4-oxohexanoic acid, 6-oxoheptanoic acid, 7-oxooctanoic acid, nonanoic acid, decanoic acid, and dodecanoic acid.

4. The waterborne coating composition of claim 1, wherein the diester is a reaction product of hydroxypivalyl hydroxypivalate with one or more C4-C8 monofunctional carboxylic acids or their anhydride, halide, or ester derivatives.

5. The waterborne coating composition of claim 4, wherein the one or more C4-C8 monofunctional carboxylic acids comprise one or more selected from the group consisting of butyric acid, isobutyric acid, pentanoic acid, hexanoic acid, levulinic acid, heptanoic acid, octanoic acid, 2-ethylhexanoic acid, 4-acetylbutyric acid, 4-oxohexanoic acid, 6-oxoheptanoic acid, and 7-oxooctanoic acid.

6. The waterborne coating composition of claim 1, wherein the diester is a reaction product of hydroxypivalyl hydroxypivalate with one or more C5-C7 monofunctional carboxylic acids or their anhydride, halide, or ester derivatives.

7. The waterborne coating composition of claim 1, wherein the diester is a reaction product of hydroxypivalyl hydroxypivalate with levulinic acid, hexanoic acid, or a mixture thereof.

8. The waterborne coating composition of claim 1, wherein the hydroxypivalyl hydroxypivalate diester is present in an amount from 1% to 15% by weight, based on the solids of the latex polymer (a).

9. The waterborne coating composition of claim 1, wherein the hydroxypivalyl hydroxypivalate diester is present in an amount from 1% to 10% by weight, based on the solids of the latex polymer in (a).

10. The waterborne coating composition of claim 1, wherein the diester is a reaction product of hydroxypivalyl hydroxypivalate with levulinic acid, hexanoic acid, or a mixture thereof, and the diester is present in an amount from about 1% to less than 10% by weight, based on the solids of the latex polymer in (a).

11. The waterborne coating composition of claim 1, further comprising one or more hydroxypivalyl hydroxypivalate monoester.

\* \* \* \* \*